(12) United States Patent
Wijnschenk et al.

(10) Patent No.: US 6,270,728 B1
(45) Date of Patent: Aug. 7, 2001

(54) TEST TUBE WITH OPTICALLY READABLE CODING

(75) Inventors: Ronald Josephus Clemens Wijnschenk, Dronten; Bartholomeus Wilhelmus Kramer, Lelystad, both of (NL)

(73) Assignee: Micronic B.V., Lelystad (NL)

( * ) Notice: Subject to any disclaimer, the term of this patent is extended or adjusted under 35 U.S.C. 154(b) by 0 days.

(21) Appl. No.: 09/230,712
(22) PCT Filed: Jul. 30, 1997
(86) PCT No.: PCT/NL97/00447
§ 371 Date: Jan. 29, 1999
§ 102(e) Date: Jan. 29, 1999
(87) PCT Pub. No.: WO98/05427
PCT Pub. Date: Feb. 12, 1998

(30) Foreign Application Priority Data

Aug. 1, 1996 (NL) ................................. 1003726

(51) Int. Cl.[7] ............... B01L 9/06; G06K 7/10; G06K 19/06; G09F 3/02
(52) U.S. Cl. ............ 422/102; 422/915; 206/439.5; 235/454; 235/462.01; 235/470; 235/472.01; 250/566

(58) Field of Search .................. 422/915, 102, 422/72, 101; 206/459.5; 235/454, 462.01, 470, 472.01; 250/566

(56) References Cited

U.S. PATENT DOCUMENTS

| 3,818,188 | 6/1974 | Hertel et al. . |
| 4,990,792 | 2/1991 | Frei . |
| 5,175,774 | 12/1992 | Truax et al. . |

FOREIGN PATENT DOCUMENTS

| 0569835 | 11/1993 | (EP) . |
| 0645187 | 3/1995 | (EP) . |
| 2266641 | 10/1975 | (FR) . |
| 2649511 | 1/1991 | (FR) . |
| 8908264 | 9/1989 | (WO) . |
| 9402857 | 2/1994 | (WO) . |
| 9607479 | 3/1996 | (WO) . |
| 9608433 | 3/1996 | (WO) . |
| 9718896 | 5/1997 | (WO) . |

*Primary Examiner*—David A. Reifsnyder
(74) *Attorney, Agent, or Firm*—Bachman & LaPointe, P.C.

(57) ABSTRACT

A test tube includes a dot code on the surface thereof which is readable with an optical reading mechanism wherein the dot code is formed on the test tube by laser burning.

27 Claims, 4 Drawing Sheets

TEST TUBE WITH OPTICALLY READABLE CODING

The present invention relates to a test tube, comprising a tubular container, which tubular container at its bottom end is provided with an optically readable coding such as a dot code.

A container resembling such a test tube is known from WO 94/02857.

A test tube in this case should be understood as meaning a container for storing substances, as well in liquid form, as in powder form as in solid form, for chemical analyses, sample storage etc. Such test tubes can range in size from small test tubes, for example test tubes with a capacity of 0.2 ml, to large test tubes with a capacity of 10 ml or more.

Test tubes are commonly used for storing samples, such as blood samples of humans and animals, for possible subsequent analysis. Such samples may be divided among a number of test tubes if necessary. In addition, many samples are stored for other purposes. In the case of all these applications it is extremely important to be able to code the test tubes, in order to be able to keep a record of the contents of each test tube. The test tubes are generally arranged in the racks in an 8×12 configuration, so that each rack contains 96 test tubes. It is known to allocate a position code to each test tube in the rack by numbering the rows and columns. The eight rows are then numbered, for example, A to H, while the twelve columns are numbered 1 to 12. In this way, depending on the position in the rack, each test tube can be given its own code, for example A1, C7, H9 etc. Such a coding is generally not indicated on the tubes, but along the sides of the rack. Such a coding may also be indicated on the tube itself, if desired, this being of benefit only if the tube does not form a fixed part of the rack. These codings are designed to be read with the human eye. These codings are applied directly to the transparent test tube, which has the disadvantage that in the case of certain substances the coding is very difficult or impossible to read.

A container bearing some resemblance to the test tube of the type mentioned at the beginning is known from International Patent Application WO 94/02857. This publication relates to a "reagent bottle identification and reagent monitoring system for a chemical analyzer". In this case, in a chemical analyzer use is being made of reagent bottles which at their top end are provided with a narrowed neck and at their bottom end are provided with a dot code at the downward facing surface of the bottom. This dot code is applied to a printed label which can be fixed by means of an adhesive to the downward facing surface of the bottom. According to a preferred embodiment, each label here has a light-coloured background on which a contrasting pattern of dots is printed. As stated in this publication, smallest dot sizes with a diameter of approximately 850 $\mu$m can be achieved here, while the surface required for the dot code must have a diameter of at least approximately 13 mm.

The object of the present invention is to provide a coded test tube, preferably a uniquely coded test tube, in the case of which the coding is readable at all times.

This object is achieved according to the invention with a test tube comprising a tubular container, which tubular container at its bottom end is provided with an optically readable coding such as a dot matrix, characterized in that the optically readable coding is applied to an optically substantially opaque surface, in other words, an optically substantially opaque background with a surface bearing the coding. Applying the optically readable coding to an optically substantially opaque background ensures that the optical coding is readable at all times with an optical reading mechanism, irrespective of the substance present in the generally transparent test tube. If the surface or the background is not or is insufficiently optically opaque, errors could occur during reading of the code, as a result of reflections coming from the substance present in the test tube. By applying the optically readable coding at the bottom end of the test tube, simple automated reading of the coding with the aid of an optical reading mechanism is made possible. For the test tube need only be held with its bottom end towards an optical reading mechanism, which is then possible in principle while the test tube is still in a rack, even if a number of test tubes are situated next to each other in the rack.

In order to be able to read the optically readable coding from underneath with great certainty, it is advantageous according to the invention if the optically substantially opaque surface is substantially flat and faces downwards, and extends substantially in the crosswise direction of the tube. Making the surface flat ensures that the risk of errors during the automated optical reading of the coding is minimized by avoiding optical deformations, and providing the surface facing downwards at the bottom end of the tubular container ensures that the circumferential measurements of the tubular container can remain substantially unchanged.

Since, on account of their material properties, not all test tubes can be provided with an optically opaque surface, i.e. an optically opaque background, applied directly thereto, and not every test tube material is so suitable for direct application of a coding thereto, it is advantageous according to the invention if said surface is applied to a carrier part fixed to the bottom end of the tubular container. Such a carrier part according to the invention can be fixed to the tubular container if the tubular container comprises retaining means, such as a retaining lug or retaining recess, at its bottom end, but it is also very conceivable for the carrier part to be glued or stuck or pressed onto the tubular container.

According to a special, advantageous embodiment, the carrier part will be made of a material which is different from the material from which the tubular container is made and which is suitable for the application of the optically readable coding. This makes it possible to continue using materials which have proved very suitable for the actual test tube itself, such as in particular optically transparent materials, and still to provide said test tube with an optical coding which is easily readable in all circumstances.

In order also in particular to be able to provide very small test tubes—for example, having a diameter of approximately 8.5 mm and smaller—with a coding which is unique for the test tube in question, it is very advantageous according to the invention if the material of the carrier part is suitable for burning in the optically readable coding by means of a laser technique, which coding in this case is preferably a fine dot code. What is meant here by a fine dot code is a code in which the centre-to-centre distance between adjacent dots is less than 0.5 mm, preferably 0.4 to 0.35 mm or less. With such a laser technique, dots with a diameter of less than approximately 200 $\mu$m, for example approximately 150 to 175 $\mu$m, can be achieved in the case of a carrier part made of a material suitable for the purpose. An average person skilled in the art will be able to name widely varying suitable materials for the carrier part which not only permit the application of such a fine dot code by a laser technique which is known per se, but also provide an optically opaque background for trouble-free reading of the dot code. Polystyrene, possibly provided with a suitable filling agent or filling substance, can be mentioned as an example of such a suitable material. Another example which can be mentioned is ABS (acrylonitrile butadiene styrene), which in itself has a white basic structure and lends itself very well to burning in a very fine dot code by means of a laser technique. Other plastics. for example filled with titanium white or zinc white, seem suitable for burning in a very fine dot code by a laser technique, but plastic to which. $TiO_2$-coated ground mica particles are added are also very suitable for this purpose.

The carrier part according to the invention can advantageously be a part moulded onto the tubular container, such as a gated plastic part. Plastics are relatively easily gated into other plastics or other materials, retaining means or interlocking means possibly being provided so that they remain joined to each other.

According to the invention, the carrier part can be designed in many different ways. For example, according to the invention it is very conceivable for the carrier part to comprise at its top side a cavity in which the bottom end of the tubular container is accommodated and is fixed to the carrier part by means of a snap connection. However, it is also very conceivable for the carrier part to be accommodated in the tubular container, by extending the side wall of the tubular container at its bottom end until it is beyond the bottom of the tubular container, in order to form a space below said bottom for accommodating the carrier part. In order to be able to confine a carrier part in this space, it is advantageous according to the invention in this case if at the bottom end of the extended side wall at least one retaining lug pointing into the space or at least one retaining recess which opens towards the space is provided. The carrier part can then be fitted in the space and the retaining lug or retaining recess will prevent the carrier part from coming out of the space.

According to an advantageous embodiment, the carrier part in this case is a plastic part injected into the space. Such a plastic part can then be injected into this space after or during the manufacture of the test tube. If this carrier part is injected into the space during or after or immediately after the manufacture, co-moulding processes suitable for this purpose which are known per se from the prior art can then be used. The plastic part in this case can be a plastic which is selected for its properties in connection with the application of the optically readable coding thereto. The optically readable coding must be able to adhere to this plastic part, and this plastic part must provide an optically substantially opaque surface, which is readily achievable by using a non-transparent, i.e. opaque, plastic. According to another advantageous embodiment of the invention, the carrier part is an element which is fixed by snapping between the at least one retaining lug and a further stop member, such as the bottom of the tubular container. Such an element can therefore then be fitted in the space formed below the bottom of the tubular container after the test tube has been formed, by pressing said element into it, after which a snap-in lock holds the element in place.

According to a further advantageous embodiment of the test tube according to the invention, at its bottom end the tubular container is provided with an annular groove formed on the outside, which groove preferably extends over at least part of, but preferably over the entire circumference of the container, and at its bottom end the tubular container is further provided with one or more, preferably two, three or four, channels extending from the annular groove to substantially the bottom end of the tubular container, and the carrier part comprises:

a plate situated at the bottom end of the tubular container;

arms extending from the plate through the channels to the annular groove; and a ring extending through the groove;

the plate, the arms and the ring being formed integrally from plastic, and the arms and the ring retaining the plate at the bottom end of the container. Making the bottom end of the container in such a way means that the so-called carrier part can easily be applied as a moulded-on part by an injection moulding technique, a reliable permanent fixing of the carrier part to the tubular container being ensured by the ring, which bears the plate (to which the coding can be applied) by way of the arms. According to a further advantageous embodiment, the channels in this case are grooves formed in the outside wall of the container. This makes it possible also to produce the tubular container as an injection moulded product. It is particularly advantageous here if the carrier part accommodates the bottom end of the container in a close-fitting manner as a sort of basket, the free spaces in the wall of the basket-type part (i.e. the spaces between the grooves/channels/arms) accommodating projecting parts at the bottom end of the container. A reliable, simple and sturdy retention of the carrier part on the tubular container is thereby ensured.

According to an advantageous embodiment, the tubular container can be made of a polypropylene or polypropene or other plastic suitable for test tubes. Types of polypropylene or polypropene suitable for test tubes are generally known from the prior art. Types of polypropylene or polypropene suitable for test tubes form a generally unsuitable substrate for an optically readable coding, unless something is added for such a coding.

A test tube according to the invention is also preferably transparent.

The invention also relates to a rack, in particular a storage and/or transportation rack, with a multiplicity of accommodation positions for accommodating test tubes according to the invention therein, the accommodation positions being optically open at the underside, in such a way that the optically readable coding of test tubes to be placed therein can be read from the "underside" of the rack with an optical reading mechanism. What is meant in this case by "underside" of the rack is the underside of the rack viewed from the orientation of the test tubes, the side of the rack where the bottom ends of the tubular containers are situated then forming the underside of the rack. Such a rack has the advantage that the test tubes placed therein can be read by means of an optical reading mechanism without the test tubes first having to be removed from the rack. According to a further special embodiment, such a rack comprises test tubes according to the invention in at least a number of the accommodation positions, possibly in all accommodation positions. In particular, the rack can have 96 accommodation positions placed in a 12×8 matrix pattern. The test tubes in this case can be small test tubes with a diameter of approximately 8.5 mm and a centre-to-centre distance of approximately 9 mm, for example 8.5 to 9.5 mm, between adjacent test tubes. What is meant in this case by centre-to-centre distance is the distance between the longitudinal axes of adjacent test tubes.

The invention also relates to an assembly comprising a rack according to the invention, test tubes according to the invention and an optical reading mechanism for reading the optical codings on the test tubes.

The invention also relates to an assembly comprising a rack according to the invention and an optical reading mechanism, the optical reading mechanism comprising a supporting frame for supporting the rack to be placed thereon, in which a multiplicity of substantially vertically oriented test tubes can be placed, and a reader fitted in the supporting frame and reading substantially in the vertical, upward direction. Such an assembly of a rack and an optical reading mechanism makes it possible to place a fully or partially filled rack on the reading mechanism and to have the optical codings of the test tubes placed in the rack automatically read out by the reader. The reading mechanism in this case will preferably be provided with a microprocessor which is equipped to allocate the codes which have been read to the accommodation position in the rack. This makes it possible, by means of suitable display means, to obtain information on the position of a particular test tube in the rack. In order to be able to establish unequivocally the position of the test tubes in the rack, it is advantageous according to the invention if the rack and the optical reading mechanism are provided with means for unequivocally determining or recording the position or orientation of the rack relative to that of the reading mechanism or the frame thereof. Such means can comprise a further optical coding which is applied to the underside of the rack, and which is then readable by the reading mechanism, but it is also very conceivable for such means to comprise mechanical means which ensure that the rack can be placed only in one position on the frame, or which make it possible to place the rack in an unequivocally determined position on the frame of the reading mechanism.

It is also advantageous if a switch which emits a "correct" or "incorrect" signal or both types of signals is activated, for example by means of a lug or notch, when the rack is positioned correctly or incorrectly respectively.

The optical coding used according to the invention is preferably a unique coding, i.e. a coding system by means of which a virtually infinite number of unique codings can be achieved. Such a coding system can comprise a so-called bar code, but will preferably consist of a matrix-like pattern of dark and light dots, i.e. a matrix-like pattern in which all matrix points are dark or light, for example black or white. Such a coding made up of a dot matrix can also be indicated by the term dot matrix and is also sometimes called a dote code. Theoretically, it is then possible with, for example, a 5×5 matrix to achieve approximately 33 million ($2^{25}$) unique codings, and with a 7×7 even $2^{49}$ (approximately $5.6 \cdot 10^{14}$) different unique codes can be achieved. However, it will be clear that matrices with an uneven number of rows and columns can also be used, as can other figures based on a dots pattern. For instance, it is also conceivable to achieve a dot coding on the basis of a number of concentric dot circles, or on the basis of a spiral-shaped pattern of dots. Usable dot codings are known per se from the prior art.

The present invention will now be explained in greater detail with reference to exemplary embodiments shown in the drawing, in which.

Figure 1:
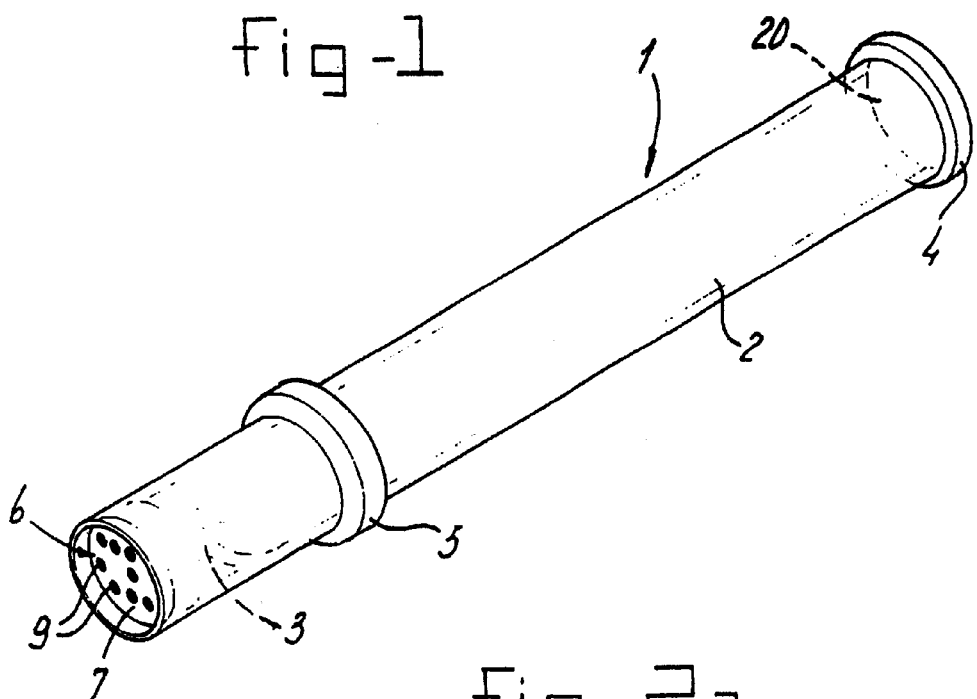
FIG. 1 shows a perspective view of a test tube according to the invention.

FIG. 1 shows a test tube 1. Said test tube 1 consists substantially of a tubular container 2 having at its top end a filling aperture 20 which may be shut off if necessary. At the bottom end, the tubular container 2 is provided with a bottom 3, in the exemplary embodiment shown a dome-shaped bottom 3. At its bottom end, the test tube is further provided with an optically readable coding 9, in the form of a dot matrix. Said optically readable coding is applied to an optically substantially opaque surface, i.e. a surface or background which is opaque to the optical reading mechanism to be used, so that the reading with the optical reading mechanism cannot be interfered with as a result of substances, powders, liquids or solid particles present in the test tube. The term "optically opaque" is thus related to the optical reading mechanism used, and in general will amount to said surface or background also being opaque to the human eye. The optically substantially opaque surface is indicated by 7.

Figure 2A:
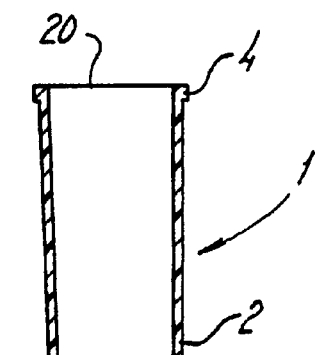
FIG. 2a shows a longitudinal sectional view of the test tube shown in FIG. 1.

The test tube shown in FIG. 1 and FIG. 2a relates to a test tube with a length of approximately 40 mm and an external diameter of approximately 8.5 mm. The surface available on surface 7 for the optical code, i.e. the dot code, has a diameter of approximately 3 mm. The material of which the tubular container is made in this embodiment is a transparent PP plastic.

The optically substantially opaque surface 7 is substantially flat and directed downwards, so that it extends crosswise to the lengthwise direction of the tubular container 2. This means that the optical coding can be read from underneath with an optical reading mechanism, the term "from underneath" being related to a vertical position of the test tube shown in FIGS. 2a and 2b.

The optically opaque surface 7 in the case of the test tube according to FIG. 1 is applied to a carrier part 6 fixed at the bottom end of the tubular container 2, which carrier part can be made of, for example, polystyrene or ABS. Said carrier part 6 in the case of FIGS. 1 and 2a is a disc-like element which is enclosed in a space bounded at the top side by the bottom 3 of the tubular container 2 and bounded in the circumferential direction by an extension 22 of the longitudinal side wall of the tubular container 2. Lugs 8 are formed on the underside of the extension 22, for keeping the carrier part 6 confined in the space thus formed. The carrier part 6 can be a plastic element injected into said space, but it can also be a disc pressed into the space along the two lugs 8.

Figure 2B:
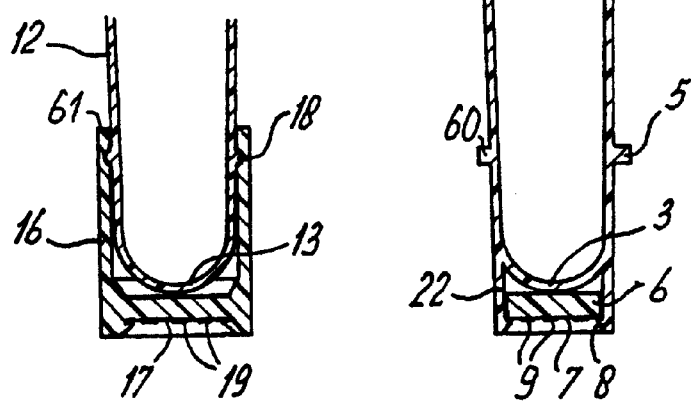
FIG. 2b shows a detail view of the bottom end of a test tube according to a further variant of the invention.

FIG. 2b illustrates an alternative embodiment of a test tube according to the invention which is provided with a carrier part. In this case only the bottom end of the test tube is shown. The tubular container in this case is indicated by 12, the carrier part by 16, the optically opaque surface by 17, the coding applied thereto by 19, and the bottom of the tubular container by 13. The carrier part 16 shown in FIG. 2b can be regarded as a tubular container with a cylindrical circumferential wall and a closed bottom. The optically substantially opaque surface 17 to which the coding 19 has been applied is then situated on the underside of the bottom. The tubular container 12 is pressed from the top with its bottom end into the cavity enclosed by the carrier part 6 and can be connected to the carrier part 6 by gluing, clamping or in some other way. According to an advantageous embodiment, one or more outward projecting retaining lugs are formed on the outer circumference of the tubular container 12 at the bottom end thereof, in order to fix the tubular container 12 to the carrier part 16, which retaining lugs can engage in corresponding retaining recesses formed in the inside wall of the cylindrical part of the carrier part 16. In this way a snap connection can be produced between the carrier part and the tubular container.

The provision of the optically substantially opaque surface and/or the optical coding (thereon) by means of a separate carrier part has the advantage that it is possible to use a carrier part with properties which are optimal for forming an optically substantially opaque surface, or at any rate an optically substantially opaque background, or for applying thereto an optically substantially opaque surface and applying an optical coding to the optically substantially opaque surface. These properties, in particular the material properties, are in fact generally not found in the test tubes used in practice. This means that in the case of the test tubes used in practice it is very difficult or even impossible to apply an optically readable coding thereto in a suitable and reliable manner. Moreover, most test tubes in practice are transparent, which would mean that an optically opaque surface would then first have to be formed on the tubular container.

Figure 7:
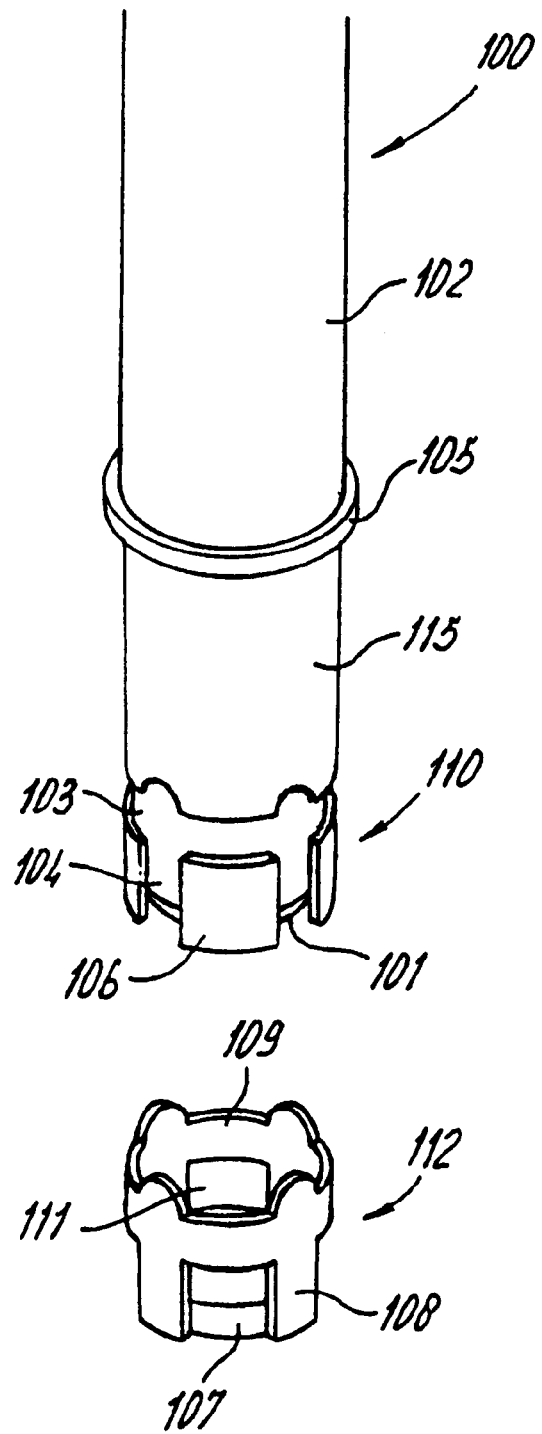
FIG. 7 shows a perspective view, with disassembled parts, of the bottom end of an embodiment of a test tube according to the invention.

FIG. 7 shows a further variant of a test tube according to the invention. FIG. 7 shows disassembled the bottom part of a test tube 100, which consists of a tubular container 102 with a bottom end 110 and a supporting collar 105, which has the same function as the supporting collar 5 of the test tube from FIGS. 1 and 2a. The bottom end 110 of the tubular container 102 is provided on the outside in the outside wall with an annular groove 103 extending around the entire circumference. The bottom end 110 is further provided with four (only two are visible) channels 104 in the form of grooves 104 extending from the bottom end 101 of the tubular container 102 up to, and even slightly beyond, the annular groove 103. Said grooves 104 and 103 can be provided by cutting material out of a tubular container 102 accordingly at its bottom end, but these grooves 103 and 104 can also be formed directly during the injection moulding of such a tubular container, by providing the injection mould with correspondingly complementary parts. For the sake of clarity, a carrier part 112 is shown as a separate part below the tubular container 102. This carrier part 112 consists of a plate 107 which at its underside, (not visible) is substantially flat, and is provided with a dot code burned in by means of a laser technique, and consists of four arms 108 and a ring 109 interconnecting the arms 108. Four recesses 111 are formed between the arms 108 and the ring 109. It will be clear from FIG. 7 that the carrier part 112 and the bottom end 110 of the tubular container 102 fit precisely into each other in a manner which is such that the projecting parts 106 are ultimately situated precisely in the recesses 111, and the plate 107 is ultimately situated under the bottom 101 of the tubular container 102. The carrier part 112 in this case is, as it were, a sort of basket which can accommodate the bottom end 110 of the tubular container 102 in a close-fitting manner. When the carrier part 112 is situated on the bottom end 110 of the tubular container 102, the arms 108 and the ring 109 will preferably not project relative to the essentially cylindrical tubular external surface 115 of the tubular container 102. The plate 107 will preferably also be slightly recessed in the bottom end, in such a way that the bottom ends of the parts 106 project beyond the plate 107. In this way it is ensured that the bottom surface of the plate 107 is slightly protected by the projecting bottom ends of the parts 106. The carrier part 112 can easily be directly injected onto or gated into the bottom end 110 of the tubular container. This can be carried out simultaneously with the injection moulding of the tubular container 100, but also in a second step after the tubular container 100 has been formed by injection moulding. It will be clear that the projecting parts 106 form, as it were, retaining projections and that the grooves 104 and 103 form, as it were, retaining recesses.

Figure 3:
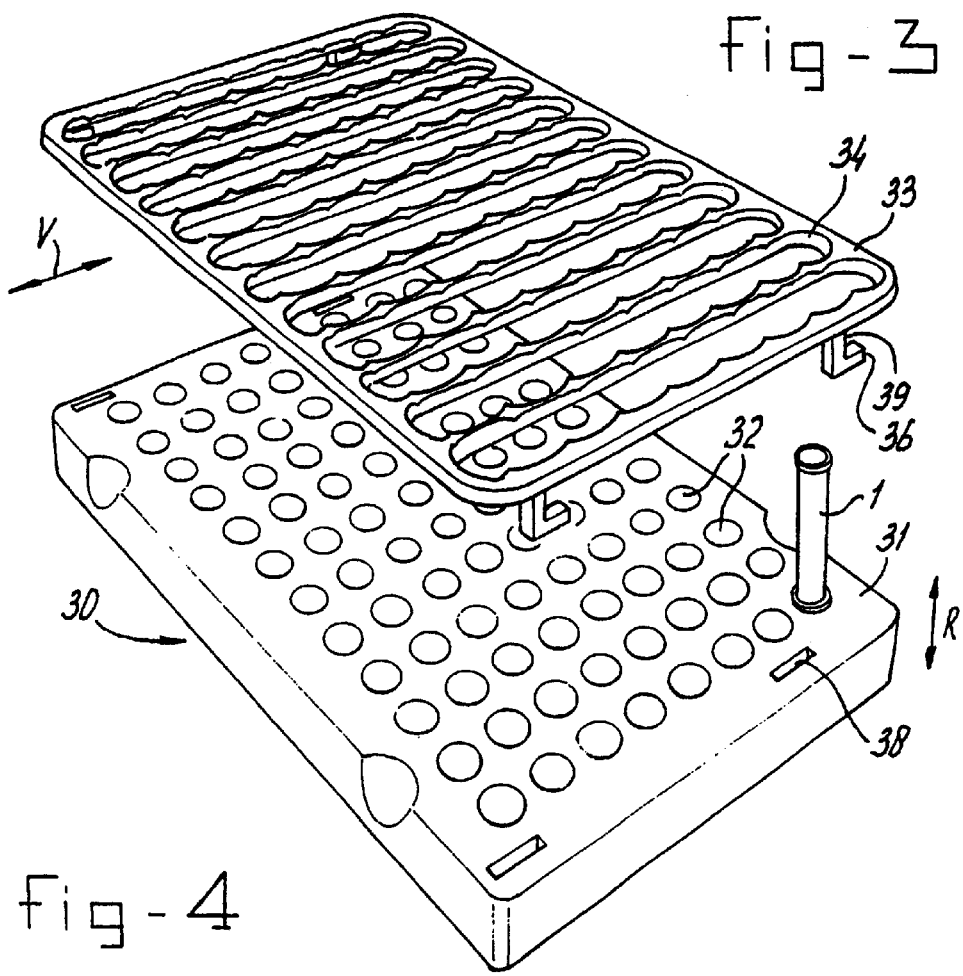
FIG. 3 shows a view in disassembled parts of a rack according to the invention, which rack is provided with a multiplicity of accommodation positions for test tubes.
Figure 4:
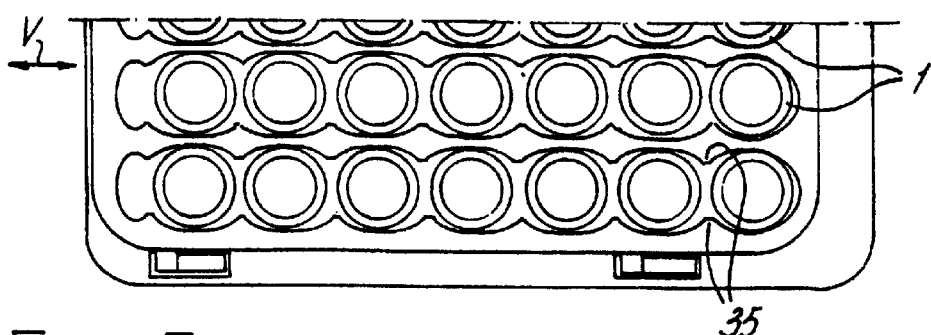
FIGS. 4 and 5 show two detail views of a rack from FIG. 3 completely filled with test tubes, the locking element being shown in the releasing and locking positions.
Figure 5:
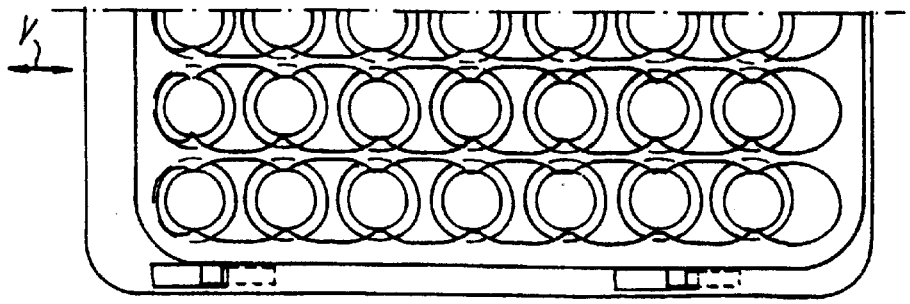

FIGS. 3, 4 and 5 show a storage and/or transportation rack according to the invention, in which a multiplicity of test tubes according to the invention can be accommodated in such a way that the test tubes can be read from the "underside" of the rack with an optical reading mechanism. This rack will be discussed in greater detail below.

The rack 30 consists substantially of a plate 31 which has therein a matrix pattern of 8×12 accommodation positions 32 in the form of passages formed through the plate 31. A test tube 1 according to the invention can be placed in each accommodation position 32, by inserting said test tube with its bottom end into an accommodation position. The test tubes 1 inserted into an accommodation position 32 then remain with their supporting collar 5 resting on the plate 31. The centre-to-centre distance between adjacent accommodation positions 32 is approximately 9 mm in this example.

The rack 30 can also optionally be provided with a locking slide 33 with twelve parallel slits, each overlapping a row of eight accommodation positions 32. Each slit 34 is provided with a series of knurls 35, provided opposite each other and facing each other on either side of each slit 34. The distance between two adjacent knurls 35 situated along one side of the slit 34 is equal to the centre-to-centre distance between two adjacent accommodation positions 32. The distance between two knurls 35 situated opposite each other is smaller than the diameter of the supporting collar 5 and equal to or slightly greater than the diameter of the tubular container 2 directly above the supporting collar 5. The slide 33 at its underside is provided with a sliding or guide mechanism, comprising four L-shaped hooks 36, which fit into the recesses 38 formed in the plate 31. When the slide 33 is inserted with its hooks 36 into the recesses 38, the slide 33 can be moved to and fro in the direction of arrow V. in which case the movement of the slide 33 is limited by the recesses 38 interacting with the vertical parts 39 of the L-shaped hooks 36. The slide 33 is thus slidable to and fro between a releasing position shown in FIG. 4 and a locking position shown in FIG. 5. In the releasing position it is possible to lift test tubes out of the rack, through the fact that between the knurls 35 the slits 34 have sufficient width to allow the supporting collar 5 of the test tubes 1 to pass. In the locked state shown in FIG. 5 the test tubes 1 are fixed in the plate 31 by the fact that the knurls 35 have been slid over the supporting collars 5. It goes without saying that the slide 33 can be fixed in the locking position shown in FIG. 5 by means of locking means (not shown). It will be clear that the sliding or guide mechanism can also be designed differently.

Figure 6:
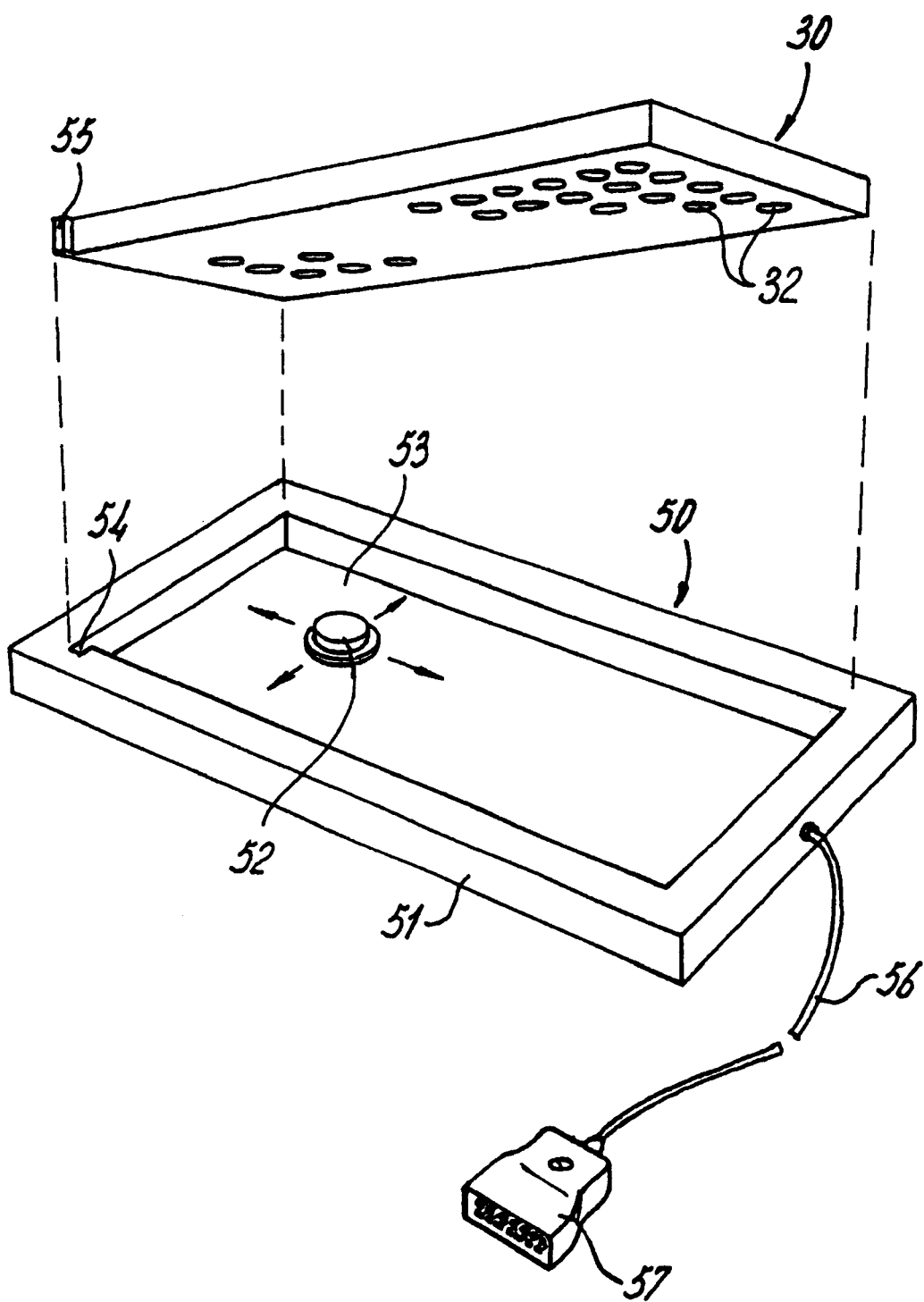
FIG. 6 shows a diagrammatic, perspective view of an assembly according to the invention, comprising a rack and an optical reading mechanism.

The rack 30 is optically open, i.e. optically transparent, at its underside, so that a reading mechanism placed below the rack 30 and reading in the vertically upward direction can read off the optically readable codings applied to the underside of the test tubes 1. This can be achieved easily in the case or rack 30, as shown in FIG. 3, by designing the rack 30 as an inverted, thin-walled tray which is physically open at the bottom (as shown in FIG. 3) or as a solid plate with recesses 32 (as shown in FIG. 6). In this FIG. 6 an optical reader 52 is also shown very diagrammatically, which optical reader, as will be clear from FIG. 6, can read off from underneath the optical coding on the underside of the test tubes 1.

FIG. 6 shows very diagrammatically an assembly containing a rack 30 and an optical reading mechanism 50. The optical reading mechanism 50 consists of a supporting frame 51 for supporting the rack 30 to be placed thereon. A region 53 is formed in the supporting frame, situated under a rack 30 placed thereon, in which region 53 an optical reader 52 is fitted, which optical reader can be moved through this region by means of an electronically controlled control unit. The optical coding on the underside of each test tube placed in the rack 30 can be read out by means of said reader 52. It is also conceivable if desired to provide the region 53 with one optical reader which can read out the codings on the underside of all test tubes simultaneously. The reader 52 shown can read out the codings per test tube or the codings of groups of test tubes simultaneously.

The frame 50 is further provided with a recess 54, which can interact with a lug 54 on the rack 30, in order to fix the orientation of the rack 30 unequivocally relative to the frame 51.

The data read by the optical reader can be transmitted by means of a cable 56 with a plug 57 to a further processing unit, such as a computer.

With the aid of such an assembly it thus becomes possible to store all data relating to the tubes present in a rack in a computer or other data storage device. The advantages which can be achieved hereby are wide-ranging and will be clear straight away without further explanation.

Instead of moving the optical reader itself, it is also conceivable to move the rack over or along the optical reader. The supporting frame could in that case be, for example, a guide plate, guide rails or a roller track.

What is claimed is:

1. A test tube, comprising a tubular container having a bottom end and a filling aperture, a carrier part, the carrier part being fixed to the bottom end of the container and having a surface provided with a dot code readable with an optically reading mechanism, the surface being substantially flat, faces away from the filling aperture and extends substantially across the bottom end of the tube, the carrier part is made of a laser burnable material wherein the dot code is burned into the surface and has a center-to-center distance between the dots of less than 0.5 mm, and wherein the tubular container is made of a material different from the carrier part material wherein the carrier part material between the dot code and the tubular container, provides the surface a background which is optically opaque to an optical reading mechanism.

2. A test tube according to claim 1 wherein the dot code has a center-to-center distance between the dots of less than 0.4 mm.

3. A test tube according to claim 1 wherein the dot code has a center-to-center distance between the dots of less than 0.35 mm.

4. A test tube according to claim 1 wherein the dots of the dot code have a diameter of less than 200 $\mu$m.

5. A test tube according to claim 1 wherein the dots of the dot code have a diameter of less than 175 $\mu$m.

6. A test tube according to claim 1 wherein the dots of the dot code have a diameter of less than 150 $\mu$m.

7. A test tube according to claim 1 wherein the carrier part is a plastic part injected into a space far in the tubular container.

8. A test tube according to claim 7 wherein the bottom end has an extended side wall provided with at least one retaining lug.

9. A test tube according to claim 8 wherein the carrier part is an element which is fixed in the space by snapping between the at least one retaining lug and the bottom end of the tubular container.

10. A test tube according to claim 1 wherein the carrier part is molded onto the tubular container.

11. A test tube according to claim 1 wherein the tubular container comprises retaining means at its bottom end for fixing the carrier part to the tubular container.

12. A test tube according to claim 1 wherein the carrier part is provided on a side opposite the surface with a cavity in which the bottom end of the tubular container is accommodated, and the carrier part and the bottom end are fixed to each other by means of a snap connection.

13. A test tube according to claim 1 wherein the bottom end of the tubular container is provided with an annular groove which extends over at least part of the circumference of the container, and in that at its bottom end the tubular container is further provided with at least one channel extending from the annular groove to substantially the bottom end of the tubular container, and wherein the carrier part further comprises a plate situated at the bottom end of the tubular container having arms extending from the plate through the channels to the annular groove, and a ring extending through the groove, the plate, the arms and the ring being formed integrally of plastic, and the arms and the ring retaining the plate at the bottom end of the container.

14. A test tube according to claim 13 wherein the channels are grooves formed in an outside wall of the container.

15. A test tube according to claim 13 wherein the carrier part accommodates the bottom end of the container in a close-fitting manner.

16. A test tube according to claim 13 wherein the tubular container is made of a material selected from the group consisting of polypropylene, polypropene and polystyrene.

17. A test tube according to claim 1 wherein the test tube is transparent.

18. A test tube according to claim 1 wherein the carrier part is formed of a material selected from the group consisting of polystyrene, ABS and metal filled plastic.

19. A storage or transportation rack with a plurality of accommodation positions for accommodating therein a test tube according to claim 1 wherein the accommodation positions are open such that the optically readable coding on the test tube placed therein is readable with an optical reading mechanism.

20. A storage or transportation rack according to claim 19 wherein the test tube according to claim 1 is accommodated in at least two of the accommodation positions.

21. A storage or transportation rack according to claim 1 wherein the rack has 96 accommodation positions placed in a 12×8 matrix pattern.

22. An assembly comprising a rack according to claim 19 and the optical reading mechanism.

23. An assembly according to claim 22 wherein the optical reading mechanism comprises a supporting frame for supporting the rack wherein a multiplicity of substantially vertically oriented test tubes of claim 1 can be placed, and a reader is fitted in the supporting frame for reading substantially in the vertical, upward direction.

24. An assembly according to claim 22 wherein the optical reading mechanism is provided with a microprocessor to allocate the codings which have been read to the accommodation positions in the rack.

25. An assembly according to claim 22 wherein the rack and the optical reading mechanism are provided with means for determining the position of the rack relative to the reading mechanism.

26. A method for coding a test tube according to claim 1 including the step of burning the dot code into the carrier part.

27. A method for coding according to claim 24 including burning the dot code with a laser.

* * * * *

UNITED STATES PATENT AND TRADEMARK OFFICE
CERTIFICATE OF CORRECTION

| | |
|---|---|
| PATENT NO. | : 6,270,728 B1 |
| DATED | : August 7, 2001 |
| INVENTOR(S) | : Ronald Josephus Clemens Wijnschenk et al. |

It is certified that error appears in the above-identified patent and that said Letters Patent is hereby corrected as shown below:

<u>Column 10,</u>
Line 63, change "24" to -- 26 --.

Signed and Sealed this

Twentieth Day of August, 2002

Attest:

JAMES E. ROGAN
Director of the United States Patent and Trademark Office

Attesting Officer